(12) United States Patent
Klinger et al.

(10) Patent No.: US 12,424,910 B2
(45) Date of Patent: Sep. 23, 2025

(54) APPARATUS AND METHOD FOR MAGNETICALLY SENSING THE POSITION OF A ROTATING DEVICE

(71) Applicant: COOPER-STANDARD AUTOMOTIVE INC., Northville, MI (US)

(72) Inventors: Gary O. Klinger, Rochester Hills, MI (US); David S. Malone, Attica, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 194 days.

(21) Appl. No.: 18/092,232

(22) Filed: Dec. 31, 2022

(65) Prior Publication Data

US 2024/0223047 A1 Jul. 4, 2024

(51) Int. Cl.
*H02K 11/215* (2016.01)
*G01D 5/14* (2006.01)

(52) U.S. Cl.
CPC ........... *H02K 11/215* (2016.01); *G01D 5/145* (2013.01)

(58) Field of Classification Search
CPC .............................. H02K 11/215; G01D 5/145
See application file for complete search history.

(56) References Cited

U.S. PATENT DOCUMENTS

| | | | |
|---|---|---|---|
| 5,574,364 A | 11/1996 | Kajimoto et al. | |
| 7,208,939 B2 * | 4/2007 | Frederick | G01D 5/145 |
| | | | 324/207.2 |
| 8,089,269 B2 * | 1/2012 | Tomioka | G01D 5/2457 |
| | | | 324/207.2 |
| 8,857,464 B2 | 10/2014 | Dolenti et al. | |
| 10,931,175 B2 | 2/2021 | Gassend et al. | |
| 11,002,565 B2 | 5/2021 | Welsch et al. | |
| 2006/0186879 A1 | 8/2006 | Legrand | |
| 2011/0273169 A1 * | 11/2011 | LaCroix | G01D 5/145 |
| | | | 324/207.25 |
| 2012/0319680 A1 | 12/2012 | Ueda et al. | |
| 2014/0375312 A1 * | 12/2014 | Friedrich | G01P 3/4802 |
| | | | 324/259 |
| 2020/0101791 A1 * | 4/2020 | Lim | F16C 41/007 |

FOREIGN PATENT DOCUMENTS

DE 102019119880 A1 1/2021
WO 2010117891 A2 10/2010

OTHER PUBLICATIONS

Search Report and Written PCT/US2023/077090 dated Jan. 23, 2024.

* cited by examiner

*Primary Examiner* — Stephanie E Bloss
*Assistant Examiner* — Michael A Harrison
(74) *Attorney, Agent, or Firm* — Paschall & Associates, LLC; James C. Paschall; Anthony Miologos

(57) ABSTRACT

An apparatus and method for determining the position of a ring magnet fixed to a rotating device includes locating the ring magnet proximate to a sensor that is sensitive to magnetic polarities. The ring magnet includes a plurality of magnetic pole pairs of opposite magnetic polarities, having at least one pole pair larger than at least three other pole pairs. The sensor produces an output signal for each pole pair that represents a period when a pole pair is detected by the sensor as the ring magnet is rotated by the device. The output signals from the sensor are coupled to a digital circuit that differentiates the three smaller pole pairs from the at least one larger pole pair to determine the position of the ring magnet.

16 Claims, 3 Drawing Sheets

APPARATUS AND METHOD FOR MAGNETICALLY SENSING THE POSITION OF A ROTATING DEVICE

TECHNICAL FIELD

This disclosure is generally directed to magnetic sensors. More specifically this disclosure relates to an apparatus and method for magnetically sensing the position of a rotating device.

BACKGROUND

Various sensors are known in the magnetic-effect sensing arts. Examples of common magnetic-effect sensors include, for example, magnetoresistive and Hall effect technologies. Such magnetic sensors can generally respond to a change in the magnetic field as influenced by the presence or absence of a ferromagnetic target object of a designed shape passing by the sensory field of the magnetic-effect sensor. The sensor can then provide an electrical output, which can be further modified as necessary by subsequent electronics to yield sensing and control information. Angular position sensors have applications in many fields such as in the automotive and industrial arts. For example, in automobiles angular position sensors are used in brushless direct current (BLDC) motors to detect rotor position during operation or in steering angle measurement to provide information about the direction a driver wants to go for automatic steering applications (e.g., electric power steering). Angular position sensors also find applicability in thermal management systems that may control valves and the flow of cooling and heating fluids through the thermal management system. In the automotive and industrial arts, magnetic concepts dominate as robust systems that are cost efficient. Typically, these comprise pivoted magnetic transmitters interacting with a stationary sensor sensing the magnetic field. In some applications unambiguous angular measurements within one full revolution of the rotating object, may be required. To provide exact measurements for such applications can be demanding and therefore a need for an improved method and apparatus for magnetically sensing the rotational angle or position of a rotating body.

SUMMARY

This disclosure relates to an apparatus and method for magnetically sensing the position of a rotating device.

In a first embodiment an apparatus is disclosed used in magnetic sensing applications. The apparatus comprises a sensor that is sensitive to magnetic polarities and a ring magnet associated with the sensor. The ring magnet includes a plurality of magnetic pole pairs of opposite magnetic polarities, wherein at least one pole pair is larger than at least three other pole pairs. The sensor detects each period of an analog signal produced by the magnetic polarities of each pole pair and couples the analog signals produced to a digital circuit to differentiate the three smaller pole pairs from the at least one larger pole pair.

In a second embodiment a method is disclosed for determining the position of a ring magnet fixed to a rotating device. The method comprising locating the ring magnet proximate to a sensor that is sensitive to magnetic polarities. The ring magnet comprising a plurality of magnetic poles of opposite magnetic polarities, such that at least one pole pair is larger than at least three other pole pairs. The method further includes producing an output signal for each pole pair, wherein the output signal corresponds to a period when the sensor detects the magnetic polarities of a pole pair when the ring magnet is rotated by the device. The method also includes coupling the output signal to a digital circuit that differentiates the three smaller pole pairs from the at least one larger pole pair to determine the position of the ring magnet.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
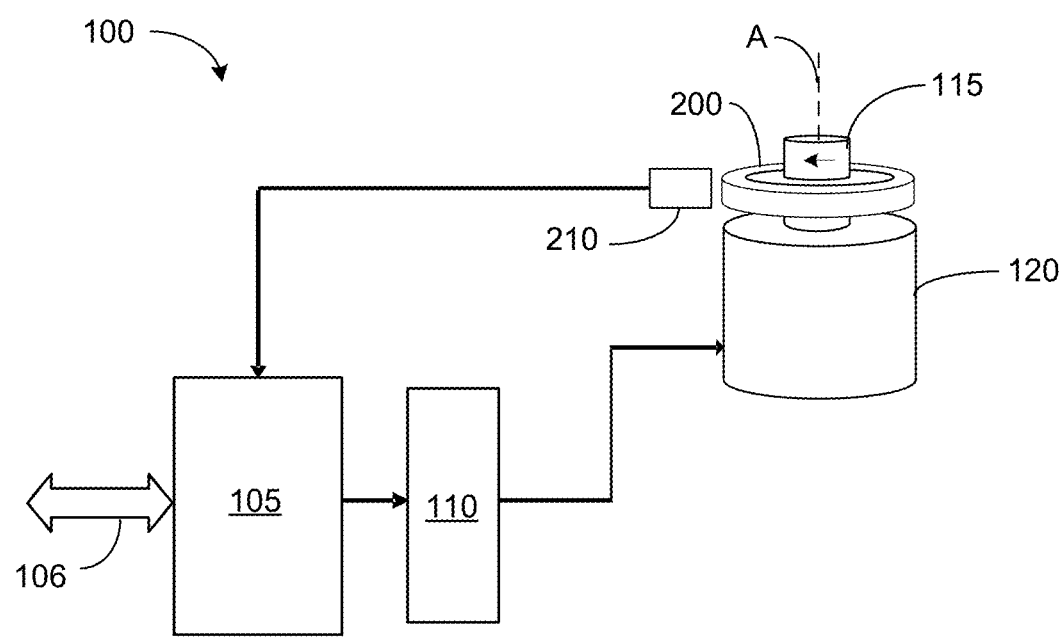
FIG. 1 illustrates an example apparatus of the present disclosure.

FIG. 1 illustrates a diagram of an example apparatus for sensing and the position of a rotating device in accordance with the present disclosure. The apparatus may be used to detect the rotational position of a rotating device, such as for example the motor shaft extending from an electrical motor. The present disclosure may also be used in sensing the rotation and position of other rotationally driven devices, such as for example, the core of a steering column and motors that drive window lifts used in vehicles or in geared actuator valves used in fluid or pneumatic systems. The apparatus of the present disclosure provides a unique N-S pattern that creates an identifiable home position and other repeatable identifiable positions as a ring magnet is rotated. The arrangement of the ring magnet generates a specific magnetic wave pattern during rotation that is uniquely identifiable in position, and which is repeatable.

The example apparatus 100 comprises a control system that may include a controller 105, and a motor drive circuit 110. The control system is communicatively coupled to an electrical motor 120 via the motor driver circuit 110. The controller may receive commands from a central controller (not shown) via a communication bus 106 to the controller 105 to have the controller actuate and drive the electrical motor 120. Control signals from controller 105 are sent to the to the motor drive circuit 100 that energizes and drives the electrical motor 120 to a commanded rotational position. The electrical motor 120 when energized rotates a core or shaft 115 attached to the electrical motor 120.

A position detection device is comprised of a multipole ring magnet 200 and a fixed position sensor 210 that is used to detect the rotational position of the core 115. The ring magnet 200 is rotationally fixed to the core 115 and rotates about a central axis A. The ring magnet 200 is rotated by the core 115 when the motor 120 is rotated. The present disclosure will be explained having ring magnet rotated in a clockwise direction by the core 115 of electrical motor 120. However, the ring magnet 200 may be rotated by core 115 in a counterclockwise direction, or alternately in both a clockwise and a counterclockwise direction in accordance with commands sent by the controller 105.

The position sensor 210 is electrically connected to the controller 105 and electrically couples signals to the controller 105 representing the rotational position of the ring magnet 200. The position sensor 210 is comprised of an anisotropic magnetoresistive (AMR) sensing device or a Hall effect device. The position sensor 210 senses the magnetic fields produced by magnet segments located on the ring magnet 200 and is used to transmit electrical signals representing the rotational position of the ring magnet 200. The signals from sensor 210 may be used by the controller 105 to calculate the position of the core 115, to provide confirmation of the current position of the core 115 and to control the electrical motor 120 to rotate the core 115 to place the core in a selected or commanded position.

Figure 2:
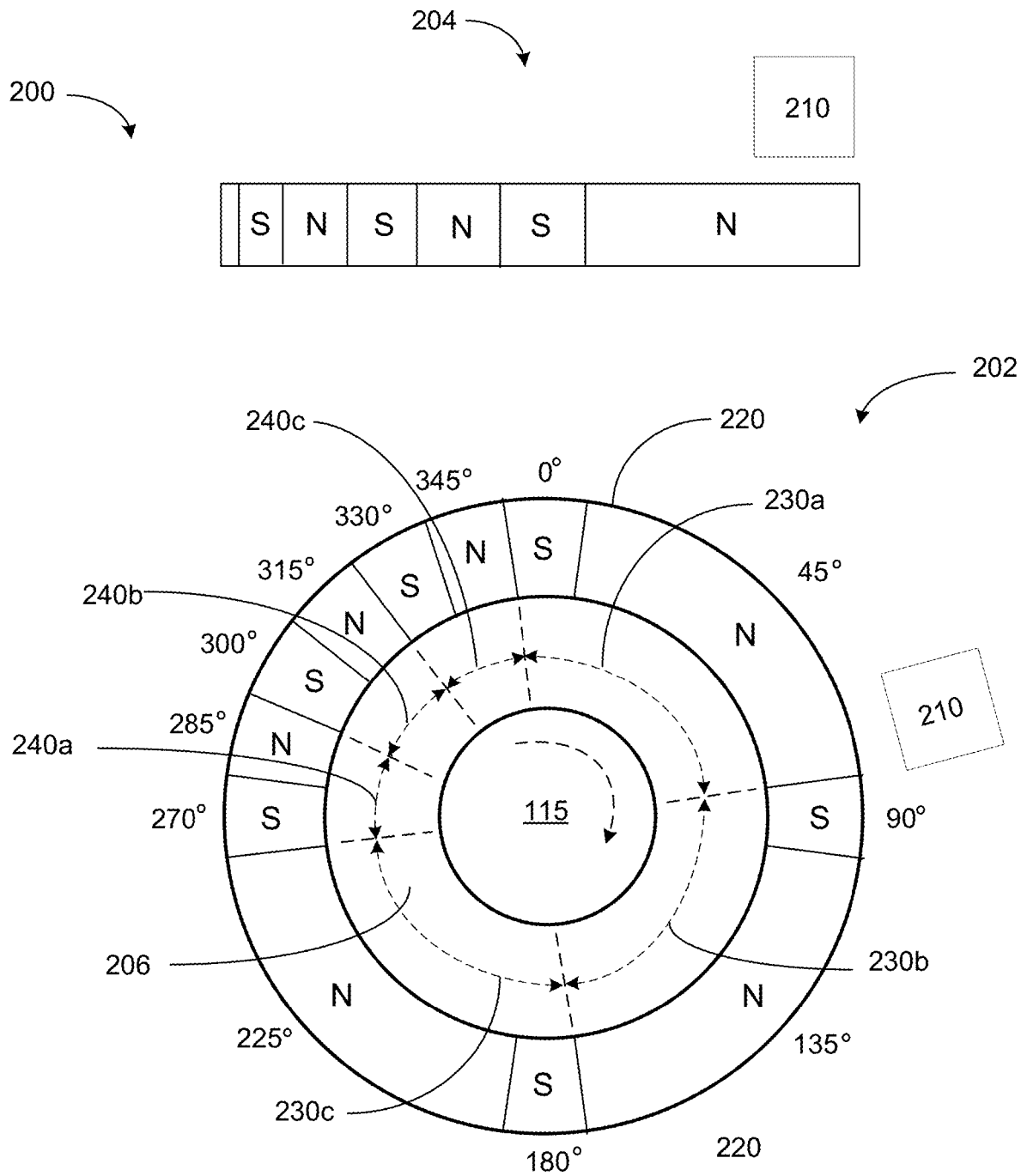
FIG. 2 illustrates an example ring magnet, which can be used in the present disclosure.

FIG. 2 illustrates a diagram of the ring magnet 200 of the present disclosure. In FIG. 2, both a top view 202 and a side view 204 of the ring magnet 200 is shown. The ring magnet 200 is configured to include a central portion 206 that is not magnetized and that is arranged to be attached in any convenient fixed manner to the core 115.

The central portion 206 is surrounded by a magnet body 220 in the shape of a ring or other circular figure. The magnet body 220 is capable of being rotated by core 115 using the central portion 206. The ring magnet 200 depicted in FIG. 2 can be configured as an axially magnetized ring magnet. A fixed position sensor 210, is located proximate to the ring magnet 200, and in the top view 202 the position sensor 210 senses the ring magnet axially. It should be noted that the position sensor 210 may also be located parallel with the magnet body 220 either over or under the ring magnet 202 as is shown in side view 204.

The ring magnet 200 is configured as an asymmetrically magnetized ring, as evidenced by the asymmetric pattern of the magnetic N-S segments located along the periphery of the magnet body 220. A plurality of magnetic poles (N-S-N-S, etc.) are generally configured along the magnet body 220 in one or more segment pole pairs. Each pole pair includes an N (i.e., north) pole and an S (i.e., south) pole. In the example of FIG. 2, 6 pole pair segments of S and N poles are shown. This includes three pole pair segments 230a, 230b and 230c comprised of a S pole that is smaller in size than an associated N pole. Three additional pole pair segments 240a, 240b and 240c are located on the periphery of the magnet body 220. Each pole pair segment of 240a, 240b and 240c having S-N poles of equal size.

In the embodiment of FIG. 2 each pole pair segment 230a, 230b, 230c has identical arc lengths. Each pole pair segment 240a, 240b, 240c also have arc lengths that are identical but are smaller in length then pole pairs 230c, 230b and 230c. Each pole pair segment 240a, 240b and 240c spans an angle of 45° of the circumference of the magnet body 220. Each pole pair segment 240a, 240b and 240c spans an angle of 15° of the circumference of the magnet body 220, totaling 45° and making up the remainder circumference of the magnet body 220. Within each pole pair segment 230a, 230b and 230c, the size of the N pole is identical to each N pole within each pole pair segment 230a, 230b and 230c. Similarly, the S pole of each of the pole pair segments 230a, 230b and 230c have identical sizes to each S pole of the pole pair segments 230a, 230b and 230c. The N poles and S poles of each pole pair segments 240a, 240b and 240c are identical in size.

The position sensor 210 is arranged to be stationary relative to the rotational displacement of ring magnet 200. The position sensor 210 is arranged to detect the magnetic fields developed by the pole pair segments 230a, 230b, 230c and 240a, 240b and 240c located along the periphery of the magnet body 220 as the ring magnet 200 rotates.

Figure 3:
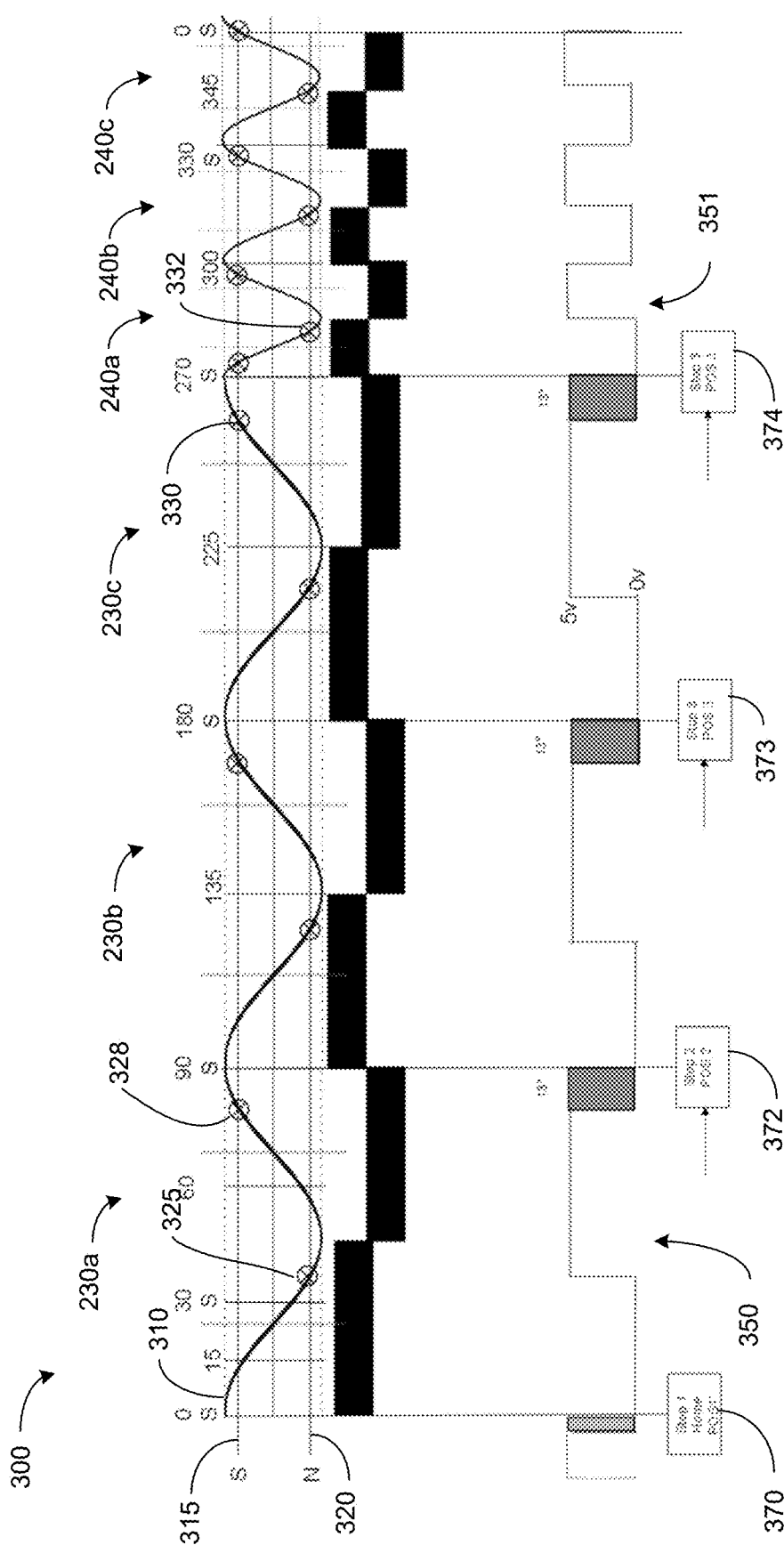
FIG. 3 illustrates an example graph showing the relationship between the magnetic analog signals and the pole pair segments of the ring magnet of the present disclosure.

FIG. 3 depicts a graph 300 illustrating the relationship between the magnetic analog signal developed by the poles pair segments 230a, 230b, 230c and 240a, 240b, 240c, in accordance with a preferred embodiment of the present invention. In graph 300, one period of a magnetic analog signal 310 can occur per pole pair segment between the S-N pole polarities of a pole pair segment. The graph defines the south magnetic region as line 315 and the north magnetic region as line 320. Rotation of the ring magnet 200 clockwise from a location of 0 degrees arc would generate a magnetic signal that swings north as it passes from the S pole of pole pair segment 230a into the N pole of the pole pair segment 230a. The crossover between the S pole of the pole pair segment 230a occurs at point 325 of the analog signal 310. Upon crossing point 325 into the N pole the magnetic analog signal 310 reaches its maximum north magnetic intensity at approximately 45 degrees of arc rotation of the magnet body 220. Further rotation of the ring body continues a swing north until it the S pole of pole pair 230b is reached. The crossover from the north pole of pole pair 230a to the south pole of pole pair 230b occurs at crossover point 328. The maximum intensity of the magnetic south signal occurs at approximately 90 degrees of rotation of the magnet body 220. As is shown at 350 the magnetic analog signals may be represented as digital signals rising and falling between 0 v and 5 v.

The magnetic analog signal 310 generated by the pole pair segments 230b and 230c develop magnetic analog signals in the same manner as explained above for pole pair segment 230a, since the pole pair segments 230b and 230c have arc lengths that are equal to pole pair segment 230a. The maximum S magnetic analog signal for pole pair 230b occurs at approximately 90 degrees of rotation and the maximum N magnetic analog signal at 135 degrees of rotation. For pole pair 203c the maximum S magnetic analog signal occurring at 180 degrees and the maximum N magnetic analog signal at 225 degrees of rotation.

As the magnet body 220 is continued to be rotated clockwise the S pole of the pole pair 240a is encountered at crossover point 330. The magnetic analog signal 310 then swings north until crossing point 332 where it reaches the maximum magnetic south intensity at the S pole of pole pair segment 240b. As illustrated in FIG. 3 the digital signal 351 of the magnetic analog signal 310 developed by pole pair segment 240a is substantially smaller than the digital signal 350 developed by each pole pair segment 230a, 230b and 230c.

Since pole pairs 240b and 240c are equal in arc length to the pole pair 240a a series of three short digital signal pulses 351 are developed by pole pair segments 240a, 240b and 240c that represent a reference point for the rotation of the ring magnet 200. For example, if the three short digital signals pulses are coupled to the controller 105 from sensor 210, this could signal to the controller 105 that a home position 370 has been reached. The home position can be used to establish a reference point for an actuator for further commanded rotations to reach a specific a location or simply used as a first point of actuation, such as for example placing a valve into a first position. A further rotation through a S to N signal transition would signify a second position 372 has been reached that can place a valve into a second switched position. Further stop points 373 and 374 can be located by the sensing device at 180 degrees and 270 degrees of rotation respectively. The crossovers between the magnetic analog magnetic swings may be used to signal the approach of a stop point. For example, the crossover point 328 from the N pole of pole pair segment 230a to the S pole of pole pair segment 230b occurs approximately 13 degrees before the location of the maximum magnetic intensity of the N pole. The crossover transition may be used as a signal that an actuator stop is approaching, and the actuator timed to stop within a certain distance of reaching the crossover. The ring magnet of the present disclosure provides a unique N-S pattern that creates an identifiable home position and other repeatable identifiable positions as the ring magnet is rotated by a core 115. The arrangement of the ring magnet generates a specific magnetic wave pattern during rotation that is uniquely identifiable in position, and which is repeatable.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus used in magnetic sensing applications, comprising:
   a sensor that is sensitive to magnetic polarities;
   a ring magnet associated with the sensor, the ring magnet magnetized to comprise a plurality of pole pairs of opposite magnetic polarities, wherein three pole pairs are larger than at least three other pole pairs, wherein the three larger pole pairs each have arc lengths that are equal and have a south magnetic pole that is smaller than its associated north magnetic pole; and
   a digital circuit associated with the sensor, wherein the sensor detects each period of an analog signal produced by the magnetic polarities of each pole pair and couples the analog signals produced to the digital circuit to differentiate the analog signals of the three smaller pole pairs from the analog signals of the three larger pole pairs.

2. The apparatus of claim 1, wherein the ring magnet includes a magnet body located on the periphery of the ring magnet.

3. The apparatus of claim 2, wherein the ring magnet includes a non-magnetic central portion surrounded by the magnet body.

4. The apparatus of claim 2, wherein the plurality of pole pairs are located on the magnet body.

5. The apparatus of claim 1, wherein the sensor device is an anisotropic magnetoresistive (AMR) sensing device.

6. The apparatus of claim 1, wherein the sensor device is a Hall effect device.

7. The apparatus of claim 1, wherein the three smaller pole pairs each have arc lengths that are equal, and each smaller pole pair contains a south magnetic pole that is the same size as its associated north magnetic pole.

8. The apparatus of claim 1, wherein the digital circuit is a digital controller arranged to convert the analog signals to digital signals that are used to differentiate the analog signals of the three smaller pole pairs from the analog signals of the at least one larger pole pair.

9. A method for determining the position of a ring magnet fixed to a rotating device comprising the step of:
   locating the ring magnet proximate to a sensor that is sensitive to magnetic polarities, the ring magnet magnetized to comprise a plurality of magnetic pole pairs of opposite magnetic polarities, such that three pole pairs are larger than at least three other pole pairs, wherein the three larger pole pairs each have arc lengths that are equal and have a south magnetic pole that is smaller than its associated north magnetic pole; and
   producing an output signal for each pole pair, wherein the output signal corresponds to a period when the sensor detects the magnetic polarities of a pole pair when the ring magnet is rotated by the device; and
   coupling the output signals to a digital circuit that differentiates the analog signals of the three smaller pole pairs from the analog signals of the three larger pole pairs and determine the position of the ring magnet.

10. The method of claim 9, wherein the ring magnet further comprises a magnet body located on the periphery of the ring magnet.

11. The method of claim 10, wherein the ring magnet further comprises a non-magnetic central portion surrounded by the magnet body and the central portion fixed to the rotating device, wherein the device rotates the central portion and the magnet body when the device is rotated.

12. The method of claim 11, wherein the plurality of pole pairs are located on the magnet body.

13. The method of claim 9, wherein the step of producing an output signal comprises using an anisotropic magnetoresistive (AMR) sensing device to produce an analog signal representative of the output signal.

14. The method of claim 9, wherein the step of producing an output signal comprises using a Hall effect device to produce an analog signal representative of the output signal.

15. The method of claim 9, wherein the three smaller pole pairs each have are lengths that are equal, and each smaller pole pair contains a south magnetic pole that is the same size as its associated north magnetic pole.

16. The method of claim 9, wherein the step of coupling the output signal to a digital circuit comprises using a digital controller to convert the output signals to digital signals that are used to differentiate the analog signals of the three smaller pole pairs from the analog signals of the at least one larger pole pair and determine the position of the ring magnet.

\* \* \* \* \*